No. 861,557. PATENTED JULY 30, 1907.
M. H. TOMKINS.
COMPUTING INSTRUMENT OR BALANCE.
APPLICATION FILED DEC. 15, 1905.
2 SHEETS—SHEET 1.
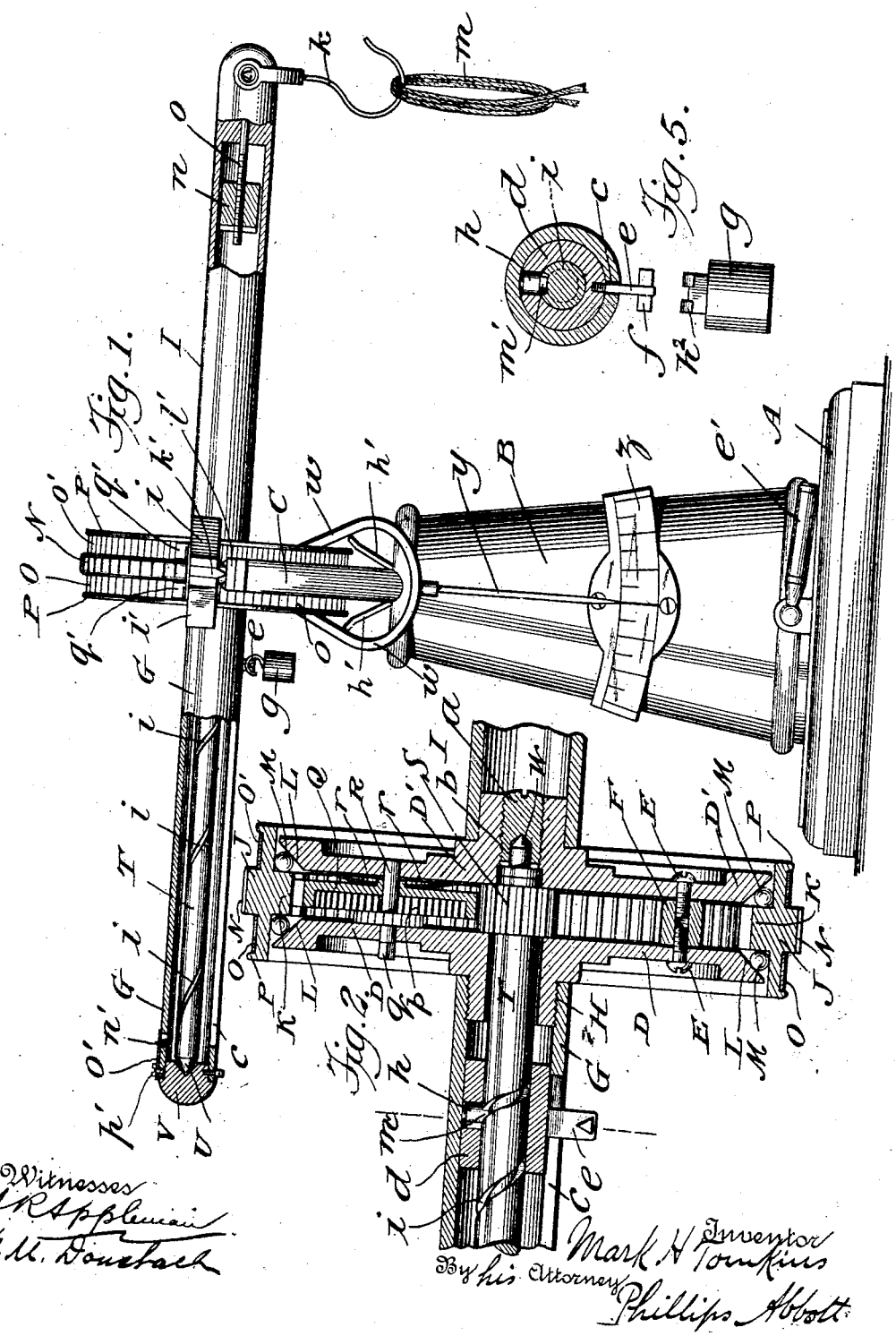

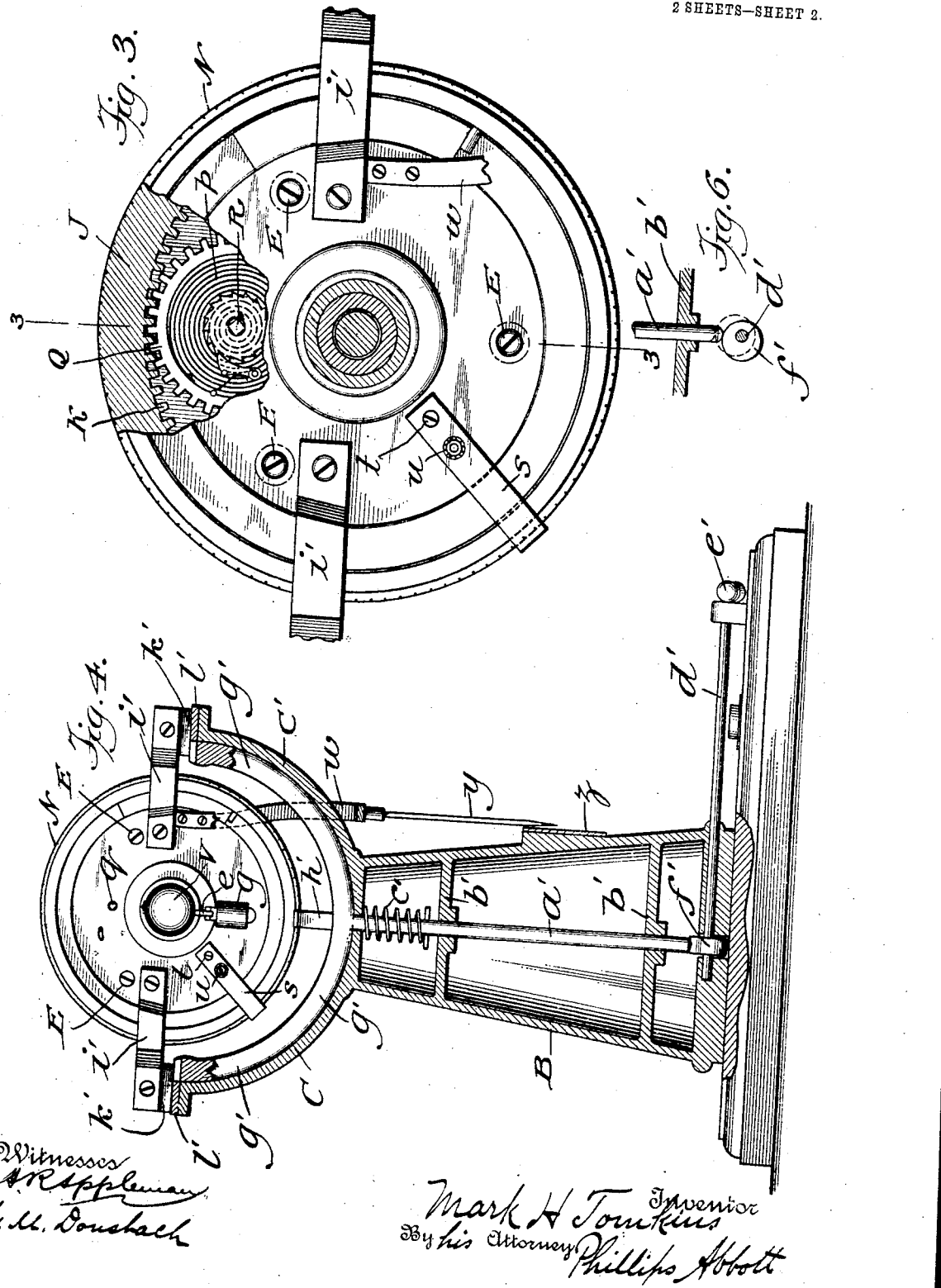

UNITED STATES PATENT OFFICE.

MARK H. TOMKINS, OF LONDON, ENGLAND.

COMPUTING INSTRUMENT OR BALANCE.

No. 861,557.            Specification of Letters Patent.            Patented July 30, 1907.

Application filed December 15, 1905. Serial No. 291,818.

*To all whom it may concern:*

Be it known that I, MARK H. TOMKINS, a subject of the King of Great Britain, and a resident at Number 53 Marmora road, Honor Oak, London, S. E., England, have invented a new and Improved Computing Instrument or Balance, of which the following is a specification.

This invention relates to a new and improved balance for indicating the number, length or quantity to the pound, or other given weight, of the article to be computed, as for example, the number of units to the pound, *i. e.*, yards of yarn, twine, wire, or other similar substance, which is presented in a uniform condition of size, diameter, length, etc., or the number of units to the pound in other articles, as for instance, the number of shot, tacks, or what not. To accomplish this a single article, or, if preferred a plurality of the same may be submitted to the instrument.

The principle upon which my instrument is constructed and operates is different from that of an ordinary scale or balance, wherein the weight is projected from the fulcrum of the scale beam by equal increments of distance, because my instrument does not operate upon the principle of an ordinary scale for determining the weight of the article, on the contrary, it proceeds upon the theory of geometrical progression. Consequently the projection of the pea along the scale beam in my instrument is effected by geometrical progression and not by equal increments of distance as demanded by the law of the lever.

Another fundamental difference between my instrument and the ordinary scale is that my instrument records the smaller differentiations in weight in proportionate parts of the unit of weight with the same distances on the index as the heavier proportionate parts; and also the nearer the pea is to the fulcrum, the smaller the weight of the individual particles becomes; consequently the greater is their number to the pound; and as the number to the pound reduces geometrically, consequently the pea must be advanced along the scale beam outwardly from the fulcrum in the same geometrically increasing increments.

Referring now to the drawings, Figure 1 illustrates a side elevation of the apparatus, partly in vertical section. Fig. 2 illustrates a central vertical section through the line 3—3 of Fig. 3. Fig. 3 illustrates a side view of the centrally located casing, within which is located the operating mechanism. Fig. 4 illustrates a side view, partly in elevation, and partly in section, showing the locking mechanism for the scale beam. Fig. 5 illustrates a cross-sectional view through the steelyard arm, the co-acting pea being shown in elevation. Fig. 6 illustrates a detail of construction of part of the locking and lifting mechanism.

A represents the base of the machine. It may be made of any suitable material, preferably a slab of wood, metal or stone. B is a hollow columnar tower or casing, preferably made of metal, which is suitably secured to the base. C, C', are two laterally projecting and oppositely arranged brackets or arms, which support the scale. They are, or may be made integral with the hollow column B. These parts constitute the support for the operative parts of the apparatus, which are as follows:

D, D' are two identical disks or plates, preferably of metal, fastened together by screws E, which thread into spacing blocks F. There are preferably three of these spacing blocks, so as to support the plates at three points, thus maintaining parallelism.

G is the steelyard arm, which is threaded as at H, to a hub on the plate D, and I is the weigh arm, which may be threaded to a similar hub on the disk or plate D', or, as shown in Fig. 2, it may be brazed thereto.

J is an annulus having teeth or cogs K on its inner surface (see Fig. 3). These cogs are formed upon an inwardly projecting rib which forms part of the annulus.

The opposed inwardly presented edges of the disks D, D', are preferably beveled as shown at L, L, see Fig. 2, and within the spaces formed between these inclined surfaces and the shoulders on the interior of the annulus J, there are located a series of anti-friction balls M, so that the annulus may be readily turned in a smooth and accurate manner without lost motion. Upon the outer surface of the annulus J, there is preferably formed a rib N, which is preferably knurled, in order that it may be easily turned.

O, O' indicate indices placed within the recesses upon the surface of the annulus at each side of the rib N. These indices are not numbered in the drawings, for the sake of clearness therein, and because the indications to be produced thereon will differ in many cases. In this connection, see the statements herein, where the operation of the apparatus is explained. This knurled rib N, together with the small lateral ribs P, P, serve to protect these indices from defacement or becoming soiled, since they rest in the depressions between them. q', q', are two indicator plates, the upper edges of which co-acting with the indices O, O', give the reading of the record.

The cogs on the inner surface of the annulus J mesh with a pinion Q (see Fig. 3) which is supported upon a shaft or axis R, and it in turn meshes with another pinion S, which is fast upon the worm shaft T, which extends longitudinally through the steelyard arm. It is accurately supported at its two ends upon point bearings, which, however, differ slightly from each other. The outermost bearing, shown at U, is an ordinary point bearing engaging with a metallic block V set in the extreme end of the steelyard arm. The inner bearing, however, as shown at W, is made in an adjustable screw block *a* threaded into the hub of the disk D′, and there is also lateral or journal bearing, as seen at b at this end of the worm shaft, so as to withstand the thrust of the gearing above described.

The steelyard arm is slotted upon its under side, as at c from end to end, or substantially so, and d is a block or traveler, which carries a depending web or member e (see Fig. 5) which projects downwardly through the slot c and has a cross-bar f near its lower end upon which the pea g is supported by hooks $h^2$, or in any other preferred manner. The traveler d is caused to move longitudinally through the steelyard arm by geometrical progression by reason of the engagement of a splined nut h with a spline or worm groove i cut spirally and longitudinally in the worm shaft T. The accuracy of the instrument depends upon the nicety with which this groove is cut, because in order to effect the geometrical projection of the pea, which is caused to travel by the engagement of the nut h in this groove, it is essential that it be cut with as nearly mathematical accuracy as possible. The first convolution of this groove, that is to say, the one nearest the fulcrum of the device is of relatively low pitch, although not of the same pitch throughout. From its very start, or extreme end, it gradually increases in pitch and each convolution in turn (in this machine there are four) increases in increasing ratio, so that, as shown in Fig. 1, the outermost extremity of the groove i is of exceedingly high pitch. The reason of this is, as above stated, that the pea may be projected from the fulcrum in corresponding geometrical progression.

k is a hook, or equivalent device (as a pan or other receptacle) upon which the material m to be weighed is supported. I prefer that this device, whatever its special form may be, and likewise the pea, shall be supported upon knife edges, as shown in Fig. 1.

In order to secure the proper adjustment of the machine during its construction, I provide an adjusting weight n, which may beneficially be a split nut threaded to a threaded spindle, o located within the weigh beam. Access to this for primary adjustment of the device may be secured in any preferred manner (not shown).

In order that there may be no lost motion in any of the parts, I concave the pinion Q and place within it a spring p provided with a ratchet and spring pawl, as usual, (see Fig. 3), the spring being so adjusted relative to the ratchet that it normally tends always to set the teeth of the pinion Q over into contact with the teeth K on the inner surface of the annulus J and likewise against the teeth of the pinion S. This spring may be wound up by the squared end of the axis R, shown at q (see Fig. 2). Similarly I provide an ordinary plate spring r (see Fig. 2) which may be of the well known star form, which takes a bearing against the inner surface of the disk D′ and bears against the outer surface of the pinion Q, whereby it is pressed against the opposing surface of the disk D, thus preventing end motion.

In order to prevent too easy rotation of the annulus J, I provide brake or drag plates s (see Figs. 3 and 4). They are in effect plate springs fastened by screws t to the outside of the plates D, D′ respectively, and are also provided with a set nut u, see Fig. 3, the threaded bolt or rod of which extends clear across from one of the springs to the other, passing through the plates D, D′, and is headed on the end opposite the set nut, so that upon turning the set nut, both springs will be simultaneously and co-extensively tightened or loosened, as occasion may require. w, w, constitute a curved bow-like structure fastened to the side plates D and D′, which carries the index needle y. z is an indicator fastened upon the face of the hollow column B. a′ is a vertically arranged spindle supported by webs b′, b′, in the column B, through which the spindle a′ slides. c′ is a spring which normally tends to depress the spindle a′. d′ is a cam shaft suitably supported, (as shown in Fig. 4) upon the end of which is a crank handle e′. f′ is a cam fastened on this shaft d′. It engages, as shown in Fig. 6, with the lower end of the spindle a′. This spindle has at its upper end a semi-circular device g′ which normally rests within and is supported by the brackets C, C′. The spindle a′ likewise has two laterally projecting horn-like devices h′ which in the operation of the machine (see Fig. 1) are adapted to receive the outer edges of the annulus J and support it during the time that the semi-circular lifting device g′ engages with the under side of the fulcrum arms of the apparatus, which are about to be described, thus lifting their knife edges from the plates of the brackets C, C′, upon which they rest, during the operation of the machine. The fulcrum arms are shown at i′, i′. They are rigidly attached to the side plates D, D′, and at their outer extremities are provided with knife edges k′, k′, (see Figs. 1 and 4). These knife edges rest upon hardened plates l′, l′, attached to the upper surface of the supporting brackets C, C′, as before stated.

I prefer that the splined nut h should be capable of partial rotation within the recess in the traveler d, so that its depending lip m′ (see Figs. 2 and 5) may have greater length than width, in other words, need not be round, for if round, it will be observed its area of contact between the vertical walls of the worm groove i will be a mere vertical line, which would be apt to wear with greater rapidity than if the surface were longitudinally increased, as shown, but this longitudinal increase of course necessitates partial rotation on the part of the nut h during its traverse from one end to the other of the steelyard arm, because of the change in pitch of that worm groove. Also in order that the nut h may be conveniently dropped into place in the traveler d, I provide an opening n′ (see Fig. 1) in the upper surface of the steelyard arm, through which the nut may be inserted and in order that dust, etc., may be excluded, I cover the opening with a plate o′ which may be rigidly held by a screw p′, as shown.

The operation of the apparatus is as follows: The instrument is normally intended to give what I will call standard indications, that is to say, the indications which are standard to the machine, in other words, one machine will be made having the pound avoirdupois as its standard, hence its indications or record will be made in the proportionate parts of a pound. Or the standard of the machine may be an ounce, and if so, its record will be proportionate parts of an ounce. So also it may be a ton, in which event, its record will be proportionate parts of a ton. Similarly the standard of the machine may be a kilogram, a hundredweight, or any other preferred weight.

The instrument illustrated in the drawings represents one actually made and now in use by me. It has the pound avoirdupois as its standard, and on it the index O, shown at the left of the knurled rib N is provided with subdivisions extending from 100 downwardly to 20. Therefore it is adapted to record from the one-twentieth to the one-hundredth parts of a pound, in other words, will weigh or determine all materials presented to it from twenty to the pound to one hundred to the pound. In this present machine also the index O' at the right hand side of the knurled rib N, for more convenient use in the cotton yarn trade, I have subdivided differently from that above described. The special manner need not here be described, because obviously the special subdivisions of the index may be such as any particular use of the apparatus may demand. I mention the fact of the dual indices upon the same instrument merely to show the scope and utilities of the apparatus.

A peculiar feature of this instrument which differentiates it from any other scale known to me is that it does not initially balance, on the contrary, it will always settle toward the pea unless there is something within the scope of the instrument (in this case from twenty to one hundred to the pound) supported upon the hook $k$, or its equivalent.

Assuming now that the instrument is in the position illustrated in Fig. 1, that is to say, the pea $g$ is at the extremity of its inner position, that is, at the nearest point to the fulcrum, and that the ring J has been turned over backwardly so that its ultimate number, 100 in this case, is at the edge of the indicator plate $q'$. If now the article to be weighed, as for example, one yard of cotton cord $m$, be placed upon the supporting hook $k$, it will overbalance the pea $g$ provided its weight is greater than the one-hundredth part of a pound. In order to ascertain what proportionate part of a pound it does weigh, the operator now turns the annulus J toward himself. In so doing through the instrumentality of the pinions Q and S rotating the worm shaft T, and causing the traveler $d$ carrying the pea $g$ with it to move outwardly along the steelyard arm with geometrically increasing progression, the index O is also turned in such manner that whereas initially the plate $q'$ indicated one hundred on the index, it successively indicates less than one hundred and consequently of course greater weight. Assume that this yard of cotton cord weighs one-seventieth of a pound. The operator will notice that as the instrument comes into balance, as shown by the indicator needle $y$ in conjunction with the index $z$ the number 70 upon the index O is approached, until finally the instrument will exactly balance when the figure 70 of that index is at the upper edge of the plate $q'$. The exact point of balance will be facilitated in a manner well known by proper manipulation of the lifting or locking device $d'$ and $e'$. In this manner the operator will ascertain that seventy such pieces as the yard of cotton cord $m$ will weigh a pound, in other words, that there will be seventy yards the pound. In like manner the number of shot or screws, or other article bought by their weight and of uniform construction may be ascertained.

Obviously any unit may be selected, that is to say, instead of being a yard of cotton cord, it may be a foot of rubber, or an inch of stout wire, or, as in the cotton trade, 120 yards or one lea. In each case (under the present example) there will be seventy parts, (whatever they may be) to the pound. In like manner, depending upon the position of the pea $g$ upon the steelyard arm, the equivalent of which will of course be shown upon the index O, articles weighing anywhere from twenty to the pound to one hundred to the pound may be weighed upon this present instrumen. Now, therefore, in order that the more minute weights may be measured, obviously all that is necessary is to provide peas bearing different relations to the machine as compared with the pea shown, that is to say, a pea weighing half as much as the pea $g$ will multiply it by two, that is to say, referring again to the instance described, instead of there being seventy yards of cotton cord to the pound, as heretofore assumed, with a pea having half as much weight as the pea $g$, there will be 140 yards to the pound. So also with a pea weighing one quarter as much as the pea $g$, there will be instead of 70 to the pound 280 to the pound. So also by increasing the weight of the pea, as for instance, in doubling it, the number per pound in this present instance would be reduced to thirty five, and so on indefinitely.

It will be seen that my machine is peculiarly useful in a large number of manufactures, wherever indeed articles are bought or sold by weight with the understanding that there shall be so many to the ounce, pound or ton, or other designated weight, as the case may be, either separately or connected, as for instance, bolts in units or yarns in connected yards. The manufacturer anxious to maintain the standard of his goods can easily and without going through the intricate and inexact process of calculation, now practiced, as well as speedily and accurately ascertain the quality of the goods he is selling and likewise the purchaser can with equal ease ascertain the quality or standard of the goods he is purchasing.

It will be obvious to those who are familiar with this art that many modifications may be made in the details of construction of the apparatus described by me without departing from the essentials of the invention; I sometimes employ the anti-friction balls shown, because smoothness and accuracy in the rotation of the annulus is thereby afforded, also the device which connects the annulus with the screw shaft may not be placed between the disks, but may be otherwise arranged. Also any suitable means whereby the movement of an exterior ring or its equivalent is conveyed to a pea-actuating device, whereby it is projected from the fulcrum by geometrical progression is within the spirit of my invention. In short, as above stated, many modifications may be made in the construction of the apparatus without departing from the essentials of the invention, and as before stated the invention is without limit as to the size or capacity of the apparatus, and obviously when employed for heavy work, as for instance when a ton is its unit, appliances adapted to manipulate so weighty a machine will of course be supplied.

I claim:

1. In apparatus for the purpose stated having a standard or unit of weight, the combination of a weighbeam and a steelyard arm fulcrumed intermediately, means upon the weighbeam for supporting the material to be weighed, a pea upon the steelyard arm, devices the uniform movement whereof will advance the pea along the steelyard arm in geometrically increasing ratio and simultaneously actuate an index adapted to record the proportionate parts of the standard of weight at which the instrument balances, and the index itself.

2. In apparatus for the purpose stated having a standard or unit of weight, the combination of a weighbeam and a steelyard arm fulcrumed intermediately, means upon the weighbeam for supporting the material to be weighed, a pea upon the steelyard arm, devices the uniform movement whereof will advance the pea along the steelyard arm in geometrically increasing ratio and simultaneously actuate an index which is adapted to record the proportionate parts of the standard of weight at which the instrument balances, the index itself and a lifting or locking device for the instrument.

3. In apparatus for the purpose stated having a standard or unit of weight, the combination of a weighbeam and a steelyard arm fulcrumed intermediately, means upon the weighbeam for supporting the material to be weighed, a pea upon the steelyard arm, a device having a spiral groove the pitch of which increases from the fulcrum outwardly in geometrical ratio adapted to rotation about the axis of the steelyard arm, means connecting the pea with said groove, a device to rotate the said grooved device about its axis and which simultaneously actuates an index which is adapted to record the proportionate parts of the standard of weight at which the instrument balances, and the index itself.

4. In apparatus for the purpose stated having a standard or unit of weight, the combination of a weighbeam and a hollow steelyard arm fulcrumed intermediately, a pea upon the steelyard arm, means upon the weighbeam for supporting the material to be weighed, a rotary shaft within the steelyard arm having a spiral groove the pitch of which increases from the fulcrum outwardly in geometrical ratio, means connecting the pea with said groove and means to rotate the shaft.

5. In apparatus for the purpose stated having a standard or unit of weight, the combination of a weighbeam and a steelyard arm fulcrumed intermediately, means upon the weighbeam for supporting the material to be weighed, a shaft adapted for rotation upon its axis and which is supported at substantially the axis of the steelyard arm and provided with a spiral groove the pitch of which increases from the fulcrum outwardly in geometrical ratio, a pea supported on said shaft and which engages with said groove, and a device fixed upon the shaft whereby it may be rotated about its axis.

6. In apparatus for the purpose stated having a standard or unit of weight, the combination of a fulcrumed lever or bar, means thereon at one side of the fulcrum for supporting the material to be weighed, a counterbalance at the other side of the fulcrum, devices by the uniform movement of which the counterbalance may be projected along said bar in geometrically increasing ratio and an index adapted to record the results at the time of balance simultaneously actuated and said index itself.

7. In apparatus for the purpose stated having a standard or unit of weight, the combination of a fulcrumed lever or bar having means to support the material to be weighed at one side of the fulcrum and a counterbalance at the other side which normally overweighs its side of the bar and uniformly moved means whereby the counterbalance may be projected from the fulcrum in geometrically increasing ratio to equalize the weight of the material being weighed.

8. In apparatus for the purpose stated having a standard or unit of weight, the combination of a weighbeam and a steelyard arm fulcrumed intermediately, a pea for the steelyard arm, means upon the weighbeam for supporting the material to be weighed, devices co-acting with the pea the uniform rotation whereof will cause the pea to advance along the steelyard arm in geometrically increasing ratio and simultaneously therewith actuate an index adapted to record the proportionate parts of the standard of weight, and not the absolute weight at which the instrument balances, and said index itself.

9. In apparatus for the purpose stated having a standard or unit of weight, the combination of a weighbeam and a steelyard arm fulcrumed intermediately, means upon the weighbeam for supporting the material to be weighed, a shaft supported by the steelyard arm having a spiral groove the pitch of which increases from the fulcrum outwardly in geometrical ratio, a pea for the steelyard arm which engages with said groove, means supported upon said shaft and located in the same plane as the fulcrum for the combined weighbeam and steelyard arm, whereby the shaft may be rotated and the pea advanced along the steelyard arm, and an index which records the proportionate parts of the standard of weight at which the instrument balances.

10. In apparatus for the purpose stated having a standard or unit of weight, the combination of a weighbeam and a steelyard arm fulcrumed intermediately, means upon the weighbeam for supporting the material to be weighed, a shaft inclosed within said steelyard arm provided with a spiral groove the pitch of which increases from the fulcrum outwardly in geometrical ratio, a pea supported upon said shaft and which engages with said groove, a device whereby the shaft may be rotated and an index upon said device adapted to record the point at which the instrument balances.

In testimony whereof I have signed my name to this specification in the presence of two subscribing witnesses.

MARK H. TOMKINS.

Witnesses:
FLORA M. DOUSBACH,
IRVING FRANKEL.